US012791762B2

(12) United States Patent
Wako

(10) Patent No.: US 12,791,762 B2
(45) Date of Patent: Nov. 10, 2026

(54) OPTICAL LAMINATE AND ANTI-REFLECTIVE FILM

(71) Applicant: DEXERIALS CORPORATION, Tochigi (JP)

(72) Inventor: Hitoshi Wako, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 305 days.

(21) Appl. No.: 18/697,314

(22) PCT Filed: Sep. 28, 2022

(86) PCT No.: PCT/JP2022/036058

§ 371 (c)(1), (2) Date: Mar. 29, 2024

(87) PCT Pub. No.: WO2023/054420

PCT Pub. Date: Apr. 6, 2023

(65) Prior Publication Data

US 2024/0393503 A1 Nov. 28, 2024

(30) Foreign Application Priority Data

Oct. 1, 2021 (JP) ................................ 2021-162974

(51) Int. Cl.
*G02B 1/115* (2015.01)

(52) U.S. Cl.
CPC .................................... *G02B 1/115* (2013.01)

(58) Field of Classification Search
None
See application file for complete search history.

(56) References Cited

U.S. PATENT DOCUMENTS 5,172,269 A 12/1992 Ogura et al.
2004/0264342 A1 12/2004 Hirayama
(Continued)

FOREIGN PATENT DOCUMENTS

JP 05053001 A 3/1993
JP 07111484 B2 11/1995
(Continued)

OTHER PUBLICATIONS

"Korean Application No. 10-2024-7008977, Office Action dated Jan. 7, 2025", w English Translation, (Jan. 7, 2025), 8 pgs.
(Continued)

*Primary Examiner* — Ryan Crockett
(74) *Attorney, Agent, or Firm* — Schwegman Lundberg & Woessner, P.A.

(57) ABSTRACT

Disclosed an optical laminate in which at least two or more optical function layers with visible light transmittance are laminated, wherein the optical function layers include a first function layer that includes at least cerium oxide, has a refractive index in a range of 1.8 or more and 2.6 or less at a wavelength of 550 nm, and has a film thickness in a range of 60 nm or more and 130 nm or less, and a second function layer that is formed in contact with an upper surface of the first function layer, has a refractive index in a range of 1.4 or more and 1.6 or less at a wavelength of 550 nm, and has a film thickness in a range of 80 nm or more and 100 nm or less.

9 Claims, 1 Drawing Sheet

(56) References Cited

U.S. PATENT DOCUMENTS

| | | | | |
|---|---|---|---|---|
| 2006/0269731 | A1 | 11/2006 | Yoshikawa et al. | |
| 2008/0286527 | A1 | 11/2008 | Haga et al. | |
| 2011/0200789 | A1 | 8/2011 | Budd et al. | |
| 2014/0192411 | A1 | 7/2014 | Hirata | |
| 2019/0310394 | A1* | 10/2019 | Miyamoto | G02B 1/18 |
| 2022/0107447 | A1* | 4/2022 | Kitamura | G02B 1/116 |

FOREIGN PATENT DOCUMENTS

| | | | | |
|---|---|---|---|---|
| JP | 09-146039 | A | * | 6/1997 |
| JP | 2002163932 | A | | 6/2002 |
| JP | 2002280534 | A | | 9/2002 |
| JP | 2005038581 | A | | 2/2005 |
| JP | 2005066937 | A | | 3/2005 |
| JP | 2005181547 | A | | 7/2005 |
| JP | 2007121993 | A | | 5/2007 |
| JP | 4155337 | B1 | | 7/2008 |
| JP | 2009217018 | A | | 9/2009 |
| JP | 2011508117 | A | | 3/2011 |
| JP | 6713485 | B2 | | 6/2020 |
| JP | 2021028730 | A | | 2/2021 |
| KR | 20190019069 | | | 2/2019 |
| WO | WO-2013015406 | A1 | | 1/2013 |
| WO | WO-2019230758 | A1 | | 12/2019 |
| WO | WO-2020153324 | A1 | | 7/2020 |

OTHER PUBLICATIONS

"International Application Serial No. PCT JP2022 036058, International Search Report dated Dec. 20, 2022", w English Translation, (Dec. 20, 2022), 6 pgs.

"International Application Serial No. PCT/JP2022/036058, Written Opinion dated Dec. 20, 2022", w/ English Translation, (Dec. 20, 2022), 6 pgs.

* cited by examiner

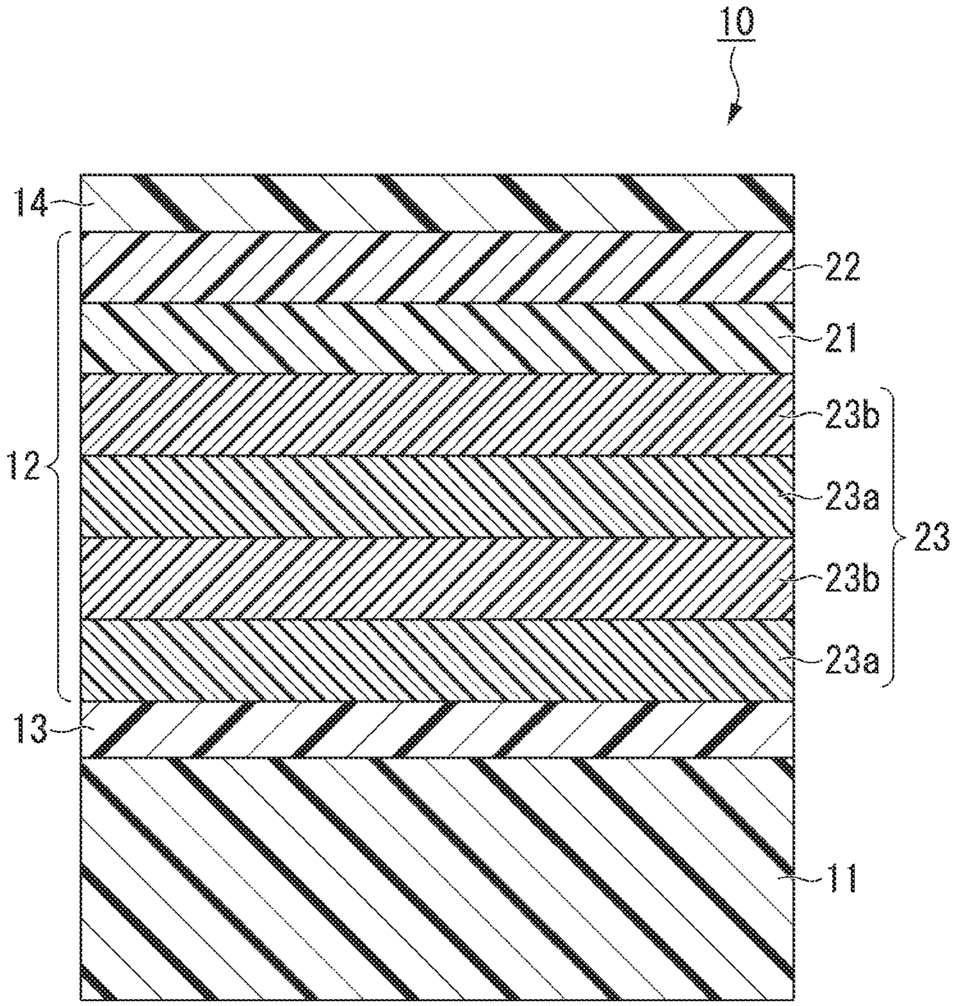
10
14
22
21
23b
23a
23b
23a
23
12
13
11

OPTICAL LAMINATE AND ANTI-REFLECTIVE FILM

PRIORITY APPLICATIONS

This application is a U.S. National Stage Filing under 35 U.S.C. § 371 from International Application No. PCT/JP2022/036058, filed on Sep. 28, 2022, and published as WO2023/054420 on Apr. 6, 2023, which claims the benefit of priority to Japanese Patent Application No. 2021-162974, filed Oct. 1, 2021; the benefit of priority of each of which is hereby claimed herein, and which applications and publication are hereby incorporated herein by reference in their entireties.

TECHNICAL FIELD

The present invention relates to an optical laminate with increased durability and an anti-reflective film using the same.

BACKGROUND ART

In the related art, an optical multilayer film (an optical laminate) in which a plurality of pieces of a transparent material having a thickness approximately equal to a wavelength of light are laminated has been applied in various fields. For example, an anti-reflective film that reduces surface reflection of light by shifting a phase of the reflection, a wavelength selective film that transmits or reflects only a specific wavelength, and the like have been used in camera lenses, window glass, and the like. In addition, the visibility of displays such as television sets may sometimes be reduced due to the reflection of external light, and the visibility can be improved by attaching an anti-reflective film.

On the other hand, with the progress of electronic technology in recent years, displays have become smaller and lighter, and thus displays have been increasingly installed in portable devices, and high-definition displays have been installed in notebook computers, smartphones, and the like. Furthermore, in recent years, with the progress of the use of IT in automobiles, a large number of displays for displaying various items of information have been installed in speedometers and other instruments, as well as navigation systems.

For such applications of the optical multilayer film, weight reduction is desired from the viewpoint of portability, and it is desired to form an anti-reflective film on a lightweight film such as a resin instead of the relatively heavy glass of the related art. In addition, even in a case where the display is made of glass, it is preferable to attach a film to a surface of the glass to prevent scattering in the event of breakage, and an anti-reflective film is often attached to the surface to prevent such scattering as well.

As a method for forming an optical multilayer film, there are generally known a wet film forming method in which materials with different refractive indices are applied in the atmosphere and a dry film forming method in which a film is formed by depositing a film forming material through sputtering or the like in a vacuum. Although the wet film forming method is convenient, the materials that can be applied are limited, and it is difficult to form an optical function layer having the optical properties required for a high-performance optical multilayer film, and it is also difficult to form a laminate obtained by laminating a large number of optical function layers.

On the other hand, a multilayer film can be easily formed with the dry film forming method by laminating a wide variety of materials many times. There are several dry film forming methods, but, in particular, a sputtering method, which uses plasma in a vacuum, has advantages such as being able to form a film even when a target material with a high melting point is used and ensuring film thickness uniformity easily and thus is widely used for forming an optical multilayer film.

In addition, particularly when the sputtering method is used, it is possible to form a film with a uniform film thickness distribution for a long time. Therefore, a roll-to-roll sputtering apparatus obtained by combining a sputtering film forming apparatus with a film conveying apparatus can form a large area film at one time and thus has an industrial advantage.

However, as a range of applications in which the anti-reflective film is particularly used among optical multilayer films expands, damage to the anti-reflective film has become a problem. The anti-reflective film is formed of a thin film of several nanometers to several hundreds of nanometers, and even if only a part of the anti-reflective film peels off or falls off, the optical interference conditions will be broken and a difference in optical properties from a non-peeling portion will become noticeable. Therefore, there has been a problem in that such a defective part is easily visible. For example, notebook computers and smartphones are now equipped with pen-touch models for touch panels, and the use environment in which a load is concentrated locally on the anti-reflective film due to repeated sliding of a stylus pen with a sharp tip and the like on the anti-reflective film is increasing. Therefore, it is required to increase the hardness (the mechanical strength) of the anti-reflective film itself.

For example, in Patent Document 1, it is disclosed that the durability of a transparent conductive film can be maintained by making the surface hardness of a thin film 0.4 to 0.8 GPa by raising the temperature of a film substrate during film formation or removing impurities such as moisture and organic substances in the film formation atmosphere in order to increase the durability of the transparent conductive film against pen input.

Further, in Patent Document 2, it is disclosed that the scratch resistance of a film can be improved by making the water absorption rate of a transparent plastic material 0.02% or less and the Vickers hardness of a film 15 or more using electron cyclone resonance (ECR) plasma.

Further, in Patent Document 3, it is disclosed that heat resistance and hardness can be improved by forming a high refractive index layer by ion-assisted vapor deposition using ditantalum pentoxide and making the compressive stress of the film 150 to 250 MPa.

Furthermore, in Patent Document 4, it is disclosed that a high hardness film can be formed to provide scratch resistance by including a diamond layer in a multilayer film, the diamond layer having diamond crystals or being made of diamond crystals and a cover layer that covers the top of the diamond layer being made of aluminum oxide, crystalline aluminum oxide, $Al_2O_3$ or a mixture with $SiO_2$.

CITATION LIST

Patent Document

[Patent Document 1]
Japanese Unexamined Patent Application, First Publication No. 2002-163932

[Patent Document 2]
Japanese Unexamined Patent Application, First Publication No. 2005-066937
[Patent Document 3]
Japanese Unexamined Patent Application, First Publication No. 2009-217018
[Patent Document 4]
Japanese Patent No. 6713485

SUMMARY OF INVENTION

Technical Problem

However, Patent Document 1 is a technology that can be applied only to some conductive oxides with limited components such as a composite oxide of indium oxide and tin oxide and is not appropriate for use in anti-reflective films that do not require conductivity.

Further, in Patent Document 2, it is difficult to form the ECR plasma stably over a long period of time, and in particular, it is difficult to stably produce the product using roll-to-roll sputtering through which the film is continuously formed.

Further, since Patent Document 3 uses the ion-assisted vapor deposition, it is difficult to apply the technology of Patent Document 3 to the formation of the anti-reflective film by sputtering.

Furthermore, in Patent Document 4, since a filament is heated to a high temperature of 800° C. to 2,500° C., the substrate is required to have heat resistance, and a resin substrate having low heat resistance cannot be used. In addition, since the cover layer is formed using magnetron sputtering, and there is a large difference in a film formation rate and the degree of a process vacuum, the equipment becomes larger and more complex for simultaneous and continuous film formation treatment, and thus it is difficult to perform mass production.

On the other hand, when the anti-reflective film is formed of a dielectric multilayer film, the outermost layer is often made of a low refractive index material with a refractive index of about 1.5, and in particular, the outermost layer is often made of silicon oxide and composite oxides mainly composed of silicon oxide, but there is a concern that repeated sliding due to pen input or the like will cause peeling.

Further, so-called hard materials such as zirconium oxide have higher hardness than silicon oxide, but have a high refractive index of about 2.0, making it difficult to apply them to the surface of the anti-reflective film. Aluminum oxide is another example of a hard material with a relatively low refractive index (about 1.7), but the film formation rate by sputtering is very low, the film formation process is complicated, and the optical properties are lower than those of silicon oxide.

For these reasons, there is a demand for an optical laminate that does not peel off even under harsh conditions such as pen sliding, can achieve a sufficient anti-reflection property, and is easy to manufacture.

The present invention has been made in consideration of these circumstances, and an object of the present invention is to provide an optical laminate that has high durability against physical stress and a low refractive index and is easy to manufacture and an anti-reflective film using the same.

Solution to Problem

In order to solve the above-mentioned problems, the present inventors found that an optical laminate that has high durability against physical stress and a low reflectance and is easy to manufacture can be obtained by forming the outermost optical function film to have a thickness within a specific range using a low refractive index material such as silicon oxide and forming the optical function film on the lower layer side of the outermost optical function film to have a thickness within a specific range using a high hardness material.

That is, in order to solve the above problems, the present invention proposes the following means.

An optical laminate of the present invention is an optical laminate in which at least two or more optical function layers with visible light transmittance are laminated, wherein the optical function layers include a first function layer that includes at least cerium oxide, has a refractive index in a range of 1.8 or more and 2.6 or less at a wavelength of 550 nm, and has a film thickness in a range of 60 nm or more and 130 nm or less, and a second function layer that is formed in contact with an upper surface of the first function layer, has a refractive index in a range of 1.4 or more and 1.6 or less at a wavelength of 550 nm, and has a film thickness in a range of 80 nm or more and 100 nm or less.

According to the present invention, the first function layer formed of the material including cerium oxide is formed in a thickness range of 60 nm to 130 nm to be in contact with the lower surface of the second function layer that is the outermost layer of the optical laminate, and thus sufficient optical properties of the optical laminate, for example, the anti-reflective film, can be obtained, and sufficient durability such as damage prevention can be obtained by the durability improving function of the first function layer even if strong physical stress is applied when a pen or the like is slid on the surface.

Further, in the present invention, the second function layer may constitute an uppermost layer of the optical laminate.

Further, in the present invention, the first function layer may contain at least one metal oxide other than cerium oxide in an elemental ratio in a range of 0.1% or more and 50% or less.

Further, in the present invention, the second function layer may contain at least silicon.

An anti-reflective film of the present invention is obtained using the optical laminate described above.

Further, in the present invention, the optical laminate may be supported by a transparent substrate made of a polymer film with visible light transmittance.

Further, in the present invention, an adhesion layer may be formed between the optical laminate and the transparent substrate.

Advantageous Effects of Invention

According to the present invention, it is possible to provide an optical laminate that has high durability against physical stress and a low reflectance and is easy to manufacture and an anti-reflective film using the same.

BRIEF DESCRIPTION OF DRAWINGS

FIG. 1 is a cross-sectional view showing an anti-reflective film having an optical laminate according to one embodiment of the present invention.

DESCRIPTION OF EMBODIMENTS

Hereinafter, an optical laminate according to one embodiment of the present invention and an anti-reflective film using the same will be described with reference to the drawings. The embodiments which will be shown below will be specifically described in order to better understand the gist of the invention, and unless otherwise specified, the embodiments are not intended to limit the present invention. Further, in the drawing used in the following description, main portions may be enlarged for convenience to make it easier to understand the characteristics of the present invention, and the dimensional ratios of each component may not always the same as the actual ones.

The anti-reflective film using the optical laminate according to one embodiment of the present invention will be described by way of example.

In the following description, the term "transparent" indicates that light in a visible light wavelength range (approximately 360 nm to 830 nm) can be transmitted.

FIG. 1 is a cross-sectional view showing the anti-reflective film having the optical laminate according to one embodiment of the present invention. An anti-reflective film 10 of the present embodiment includes a transparent substrate 11, an optical laminate 12 formed over one surface of the transparent substrate 11 to overlap the one surface, an adhesion layer 13 formed between the transparent substrate 11 and the optical laminate 12, and an anti-fouling layer 14 formed over the upper surface of the optical laminate 12 to overlap the upper surface.

The optical laminate 12 also includes a highly durable layer (a first function layer) 21, a low refractive index surface layer (a second function layer) 22 formed in contact with the upper surface of the highly durable layer 21, and an optical function multilayer film 23 formed in contact with the lower surface of the highly durable layer 21.

The transparent substrate 11 only has to be formed from a transparent material that can transmit light in a visible light wavelength range, and for example, a polymer film having a visible light transmittance of 88% or more is preferably used as the transparent substrate 11. Specific examples of constituent materials of the polymer film include polyester-based resins, acetate-based resins, polyether sulfone-based resins, polycarbonate-based resins, polyamide-based resins, polyimide-based resins, polyolefin-based resins, (meth) acrylic-based resins, polyvinyl chloride-based resins, polyvinylidene chloride-based resins, polystyrene-based resins, polyvinyl alcohol-based resins, polyarylate-based resins, and polyphenylene sulfide-based resins.

More specifically, the examples of the constituent materials of the polymer film include polyethylene terephthalate (PET), polyethylene naphthalate (PEN), polyaramid, polyimide, polycarbonate, polyethylene, polypropylene, triacetyl cellulose (TAC), polycycloolefin (COC, COP), and the like.

Although the thickness of the transparent substrate 11 is not particularly limited, it is preferable that the thickness be in a range of 20 μm or more and 1000 μm or less, for example. When the thickness of the transparent substrate 11 is 20 μm or more, the rigidity of the substrate itself is ensured, and wrinkles are less likely to occur even when stress is applied to the anti-reflective film 10.

In a case where the anti-reflective film 10 is manufactured using a roll-to-roll method, when the thickness of the transparent substrate 11 is 1000 μm or less, it is easy to wind the anti-reflective film 10 in the middle of manufacturing and the anti-reflective film 10 after manufacturing into a roll shape, and the anti-reflective film 10 can be manufactured efficiently. Further, when the thickness of the transparent substrate 11 is 1000 μm or less, the anti-reflective film 10 can be made thinner and lighter. When the thickness of the transparent substrate 11 is 600 μm or less, the anti-reflective film 10 can be manufactured more efficiently, and the film can be made even thinner and lighter, which is preferable.

As long as the optical properties are not significantly impaired, a reinforcing material may be contained in the transparent substrate 11, and examples thereof include cellulose nanofibers, nanosilica, and the like. In particular, polyester-based resins, acetate-based resins, polycarbonate-based resins, and polyolefin-based resins are preferably used. Specifically, a triacetyl cellulose (TAC) substrate is preferably used.

Also, the transparent substrate 11 may be a film provided with an optical function or a physical function. Examples of the substrate having an optical function or a physical function include a polarizing plate, a phase difference compensation film, a heat ray blocking film, a transparent conductive film, a brightness enhancement film, a barrier property-improving film, and the like.

The optical laminate 12 is a layer that exhibits an optical function. The optical function here is a function of controlling reflection, transmission, and refraction, which are the properties of light, and examples of the optical function include an anti-reflection function, a selective reflection function, an anti-glare function, a lens function, and the like.

The optical laminate 12 only has to be an anti-reflective layer, a selective reflection layer, an anti-glare layer, or the like. In the present embodiment, the optical laminate 12 is a layer that exhibits the anti-reflection function.

The highly durable layer (the first function layer) 21 constituting the optical laminate 12 is a layer that increases durability against physical stress applied to the surface of the optical laminate 12.

The highly durable layer 21 is made of a material containing at least cerium oxide. In the present embodiment, the highly durable layer 21 is made of cerium dioxide ($CeO_2$). In the highly durable layer 21, Ce in the cerium dioxide may be replaced with Nb in an elemental ratio in a range of 0.1% or more and 50% or less. In this case, it is possible to improve the film formation rate and the stability of discharge in a film formation process using sputtering, which will be described below.

The highly durable layer 21 is formed to have a film thickness in a range of 60 om or more and 130 nm or less. When the film thickness is less than 60 nm, there is a concern that sufficient durability may not be obtained. Furthermore, when the film thickness exceeds 130 nm, there is a concern that the optical properties may deteriorate.

Such a highly durable layer 21 has a refractive index in a range of 1.8 or more and 2.6 or less at a wavelength of 550 nm. By setting the refractive index within such a range, the optical function of the optical laminate 12, for example, the anti-reflection function, can be appropriately maintained.

The low refractive index surface layer (the second function layer) 22 constituting the optical laminate 12 is formed to be in direct contact with the upper surface of the highly durable layer 21. Silicon dioxide ($SiO_2$) can be used for such a low refractive index surface layer 22. A $SiO_2$ single layer film is colorless and transparent. For example, the low refractive index surface layer 22 only has to contain 50% by mass or more of $SiO_2$.

It is preferable that the low refractive index surface layer 22 also contain, for example. Na for the purpose of improving durability, Zr, Al, and N for the purpose of improving hardness, and Zr and Al for the purpose of improving alkali resistance, in addition to $SiO_2$.

The refractive index of the low refractive index surface layer 22 is in a range of 1.4 to 1.6, preferably in a range of 1.4 to 1.5.

Further, the film thickness of the low refractive index surface layer 22 only has to be in a range of 80 nm to 100 nm and only has to be appropriately selected according to a wavelength range in which the anti-reflection function is required.

The optical function multilayer film 23 constituting the optical laminate 12 is a laminate in which a high refractive index layer 23*a* and a low refractive index layer 23*b* are laminated in order from a side of the transparent substrate 11. The number of laminated layers of the high refractive index layer 23*a* and the low refractive index layer 23*b* may be two or more as in the present embodiment, or any number of layers.

As in the present embodiment, by forming the optical function multilayer film 23 from the laminate in which the low refractive index layer 23*b* and the high refractive index layer 23*a* are laminated, some of light incident from a side of the low refractive index surface layer 22, for example, external light, is reflected from the inside of the optical function multilayer film 23, the highly durable layer 21, and the low refractive index surface layer 22 and interferes with the light to cancel out their phases each other on the surface, and thus reflection is substantially suppressed. Therefore, an anti-reflection function of preventing external light incident from a side of the low refractive index surface layer 22 from being reflected can be obtained.

The optical function multilayer film 23 is made of a material containing an inorganic oxide or an inorganic nitride. Silicon dioxide (Si (2) can be used for the low refractive index layer 23*b* from the viewpoint of availability and cost. A $SiO_2$ single layer film is colorless and transparent. For example, the low refractive index layer 23*b* only has to contain 50% by mass or more of $SiO_2$.

It is preferable that the low refractive index layer 23*b* also contain, for example, Na for the purpose of improving durability, Zr, Al, and N for the purpose of improving hardness, and Zr and Al for the purpose of improving alkali resistance, in addition to $SiO_2$.

The refractive index of the low refractive index layer 23*b* is preferably 1.20 to 1.60, and more preferably 1.30 to 1.50.

Further, the film thickness of the low refractive index layer 23*b* only has to be in a range of 1 nm or more and 200 nm or less and is appropriately selected according to a wavelength range in which the anti-reflection function is required, but in the present embodiment, the film thickness of the low refractive index layer 23*b* is set to 10 nm to 40 nm, and thus, in a case where the highly durable layer (the first function layer) 21 and the low refractive index surface layer (the second function layer) 22 have a predetermined thickness, the optical properties such as reflectance and transmittance are good, which is more preferable.

As the high refractive index layer 23*a*, for example, niobium pentoxide ($Nb_2O_5$, a refractive index 2.33), titanium oxide ($TiO_2$, a refractive index 2.33 to 2.55), tungsten oxide ($WO_3$, a refractive index 2.2), cerium oxide (Ce (2, a refractive index 2.2), tantalum pentoxide ($Ta_2O_5$, a refractive index 2.16), zinc oxide (ZnO, a refractive index 2.1), indium tin oxide (ITO, a refractive index 2.06), zirconium oxide ($ZrO_2$, a refractive index 2.2), and the like can be used. Further, in a case where it is desired to impart conductive properties to the high refractive index layer 23*a*, for example, ITO or indium zinc oxide (IZO) can also be used.

Further, the film thickness of the high refractive index layer 23*a* only has to be, for example, 1 nm or more and 200 nm or less and is appropriately selected according to a wavelength range in which the anti-reflection function is required, but in the present embodiment, the film thickness of the low refractive index layer 23*a* is set to 10 nm to 40 nm, and thus, in a case where the highly durable layer (the first function layer) 21 and the low refractive index surface layer (the second function layer) 22 have a predetermined thickness, the optical properties such as reflectance and transmittance are good, which is more preferable.

The optical function multilayer film 23 of the present embodiment uses a layer made of niobium pentoxide ($Nb_2O_5$, a refractive index of 2.33) as the high refractive index layer 23*a* and uses a layer made of silicon dioxide ($SiO_2$) as the low refractive index layer 23*b*.

The adhesion layer 13 is a layer formed to improve the adhesion between the transparent substrate 11 and the optical laminate 12. The adhesion layer 13 is preferably made of, for example, a metal oxide in an oxygen-deficient state or a metal. The metal oxide in an oxygen-deficient state refers to a metal oxide in a state in which the number of oxygen atoms is insufficient compared to the stoichiometric composition. Examples of the metal oxide in an oxygen-deficient state include SiOx, ALOx, TiOx, ZrOx, CeOx, MgOx, ZnOx, TaOx, SbOx, SnOx, MnOx, and the like. Further, examples of the metal include Si, Al, Ti, Zr, Ce, Mg, Zn, Ta. Sb, Sn, Mn, In and the like. The adhesion layer may be, for example, a layer in which x in SiOx is greater than 0 and less than 2.0.

From the viewpoint of maintaining transparency and obtaining good optical properties, the thickness of the adhesion layer is preferably, for example, more than 0.1 nm and less than 20 nm, and particularly preferably more than 1 am and less than 10 nm.

The anti-fouling layer 14 is a layer for preventing staining of the optical laminate 12 and only has to be, for example, a coating layer of an alkoxysilane compound having a perfluoropolyether group. By coating the surface of the optical laminate 12 with the alkoxysilane compound having a perfluoropolyether group, the surface of the optical laminate 12 exhibits water repellency with a water contact angle of, for example, 110 degrees or more, and thus the anti-fouling properties can be improved.

The optical laminate 12 of the present embodiment includes the optical function multilayer film 23, but the optical laminate of the present invention only has to be formed of two layers including at least the highly durable layer (the first function layer) 21 and the low refractive index surface layer (the second function layer) 22 formed in contact with the upper surface of this highly durable layer 21. Further, although the anti-reflective film 10 of the present embodiment is provided with the adhesion layer 13 and the anti-fouling layer 14, the anti-reflective film 10 may have a configuration in which either or both of the adhesion layer 13 and the anti-fouling layer 14 are not provided.

Further, a layer having functions such as selective reflection, anti-glare, polarization, phase difference compensation, viewing angle compensation or expansion, light guide, diffusion, brightness improvement, hue adjustment, and conduction may be further formed on the other surface of the transparent substrate 11.

Further, the surface shape of the optical laminate 12 may be not only a smooth shape but also a shape having a moth-eye structure or an uneven structure in a nanometer order that exhibits an anti-glare function. Further, the surface shape of the optical laminate 12 may be a geometric shape in a micrometer to millimeter order of a lens, a prism, or the like. The shape can be formed, for example, by a combination of photolithography and etching, shape transfer, hot pressing, or the like. In the present embodiment, since the film is formed through vacuum film formation, even in a case where the substrate has, for example, an uneven shape, the uneven shape can be maintained.

According to the optical laminate 12 of the present embodiment having the above configuration and the anti-reflective film 10 provided with the same, the highly durable layer (the first function layer) 21 formed of the material including cerium oxide is formed in a thickness range of 60 nm to 130 nm to be in contact with the lower surface of the low refractive index surface layer (the second function layer) 22 that is the outermost layer of the optical laminate 12, and thus sufficient optical properties of the optical function film, for example, the anti-reflective film, can be obtained, and sufficient durability such as damage prevention can be obtained by the function of the highly durable layer (the first function layer) 21 even if strong physical stress is applied when a pen or the like is slid on the surface. If such an anti-reflective film 10 is adopted to a display unit of a mobile device or a notebook personal computer that is operated using a pen, it is possible to extend the life of the display unit.

Next, one embodiment of a method for manufacturing the anti-reflective film including the optical laminate of the embodiment described above will be described.

In an example of the method for manufacturing the anti-reflective film of the present embodiment, the anti-reflective film 10 only has to be manufactured by a so-called roll-to-roll method in which the anti-reflective film 10 is manufactured using the transparent substrate 11 wound into a roll shape and then the anti-reflective film 10 is wound into a roll shape.

First, the transparent substrate (the substrate) 11 wound into a roll shape is unwound. Then, the optical laminate 12 is formed on one surface of the transparent substrate 11. As for the optical laminate 12, by applying a voltage to targets including the materials constituting the layers using a sputtering device, for example, and supplying a predetermined reactive gas and argon gas that generates plasma at a predetermined flow rate, the layers constituting the optical laminate 12 can be formed.

For example, when forming the highly durable layer (the first function layer) 21, $CeO_2$ is used as the target, argon gas is used as the plasma generation gas, and $O_2$ is used as the reactive gas. Further, for example, when forming a layer made of $SiO_2$ as the low refractive index surface layer (the second function layer) 22, Si is used as the target, argon gas is used as the plasma generation gas, and $O_2$ is used as the reactive gas.

In this manner, by forming the layers on one surface of the transparent substrate 11 by sputtering, the anti-reflective film including the optical laminate can be easily manufactured.

Although the embodiment of the present invention has been described above, this embodiment is presented as an example and is not intended to limit the scope of the invention. This embodiment can be implemented in various other forms, and various omissions, replacements, and modifications can be made without departing from the scope of the invention. This embodiment and its modification examples are included in the scope and spirit of the invention, as well as the scope of the invention described in the claims and equivalents thereof.

EXAMPLES

Verification Example 1

First, the hardness of the cerium oxide thin film used as the highly durable layer (the first function layer) 21 was measured.

A thin film of cerium dioxide ($CeO_2$) as Example 1 of the present invention, a thin film of silicon dioxide ($SiO_2$) as Comparative Example 1 of the related art, a thin film of niobium pentoxide ($Nb_2O_5$) as Comparative Example 2 of the related art, and a thin film of zirconium dioxide ($ZrO_2$) as Comparative Example 3 of the related art were formed on a glass substrate.

An RF sputtering device was used to form each thin film. The RF sputtering device used for film formation has an exhaust system constituted by a turbo molecular pump and a rotary pump, and is capable of exhausting to $5\times10^{-4}$ Pa or less. Four cathodes are disposed in a vacuum chamber (a film forming chamber), and it is possible to place a target material of 2 inches in diameter on each cathode. A shutter mechanism is placed between the cathodes, and the opening and closing time can be controlled by a timer. For this reason, if the film formation rate is known in advance, the thickness of the thin film can be precisely controlled by controlling the opening time of the shutter.

A gas supply pipe is connected to the vacuum chamber to supply reactive gases such as argon gas, oxygen gas, and nitrogen gas, and carrier gases. The flow rate of each gas can be precisely controlled by a mass flow meter placed between a gas cylinder and the vacuum chamber. A conductance valve is placed between the turbo molecular pump and the vacuum chamber, and by adjusting an exhausting speed, it is possible to adjust a film forming pressure to any desired value. The substrate can be placed on a stage facing the target. The stage can rotate to make the thickness of the thin film uniform, and can be heated up to 300° C. Furthermore, the distance between the stage and the target is also adjustable.

To avoid the influence of the substrate in evaluating the hardness of each thin film, alkali-free glass (OA-10G, manufactured by Nippon Electric Glass Co., Ltd.) was used as the substrate. The substrate was washed with water using a neutral detergent, then was subjected to ultrasonic cleaning in ethanol solution for 10 minutes, then was lifted from the ethanol solution, and then droplets were immediately remove with air spray to prevent dry stains.

After the substrate was placed on a stage in the RF sputtering device configured as described above, the atmosphere was evacuated to a pressure of $5\times10^{-4}$ Pa or less, and argon gas and oxygen gas were introduced. The ratio of argon gas to oxygen gas was determined in advance by investigating the conditions under which no absorption occurs in a visible light region. Under these conditions, each of the thin films of Example 1 and Comparative Examples 1 to 3 was formed to be a film thickness of 400 nm.

In measuring the hardness, Martens hardness was measured using a Martens hardness meter. Table 1 shows the measurement results of the Martens hardness of the thin films of Example 1 and Comparative Examples 1 to 3. In addition, as a reference example, the hardness of the glass substrate was also measured.

TABLE 1

| | Material of thin film | Martens hardness ($N/mm^2$) |
|---|---|---|
| Example 1 | $CeO_2$ | 8000 |
| Comparative Example 1 | $SiO_2$ | 3600 |
| Comparative Example 2 | $Nb_2O_5$ | 4000 |
| Comparative Example 3 | $ZrO_2$ | 4000 |
| Reference example | (Glass substrate) | 3000 |

According to the results of Verification Example 1 shown in Table 1, it could be found that the thin film of the cerium dioxide of Example 1 used as the highly durable layer (the first function layer) 21 had a higher hardness than the thin films of Comparative Examples 1 to 3. Therefore, by forming the highly durable layer (the first function layer) 21 using such cerium dioxide, the durability of the surface of the optical laminate 12 can be increased.

Verification Example 2

Samples of Examples 10 to 16 and Comparative Examples 10 to 15 shown below were prepared, and the reflectance and the durability (a steel wool test) of each sample were measured.

Example 10

A triacetyl cellulose (TAC) film with an acrylic resin layer formed on one surface thereof was used as the substrate. This substrate was set in the RF sputtering device, and after the chamber was evacuated, film formation was performed. Sequentially, niobium pentoxide was formed into a film as the high refractive index layer of the optical function film, silicon dioxide was formed into a film as the low refractive index layer of the optical function film, cerium dioxide was formed into a film to be a thickness of 100 nm as the highly durable layer (the first function layer), silicon dioxide was laminated on the cerium dioxide to be a thickness of 90 nm as the low refractive index surface layer (the second function layer), and then the resultant sample was taken out from the chamber. An alkoxysilane compound having a perfluoropolyether group was used as an anti-fouling layer to be applied on the sample taken out through spin coating to be a thickness of 3 nm to 5 nm, and was left at room temperature for 1 day to obtain a sample of Example 10.

Example 11

A sample was prepared under the same conditions as in Example 10 except that the thickness of the cerium dioxide was 60 nm.

Example 12

A sample was prepared under the same conditions as in Example 10 except that the thickness of the cerium dioxide was 130 nm.

Example 13

A sample was prepared under the same conditions as in Example 10 except that the thickness of the silicon dioxide on the cerium dioxide was 80 nm.

Example 14

A sample was prepared under the same conditions as in Example 10 except that the thickness of the cerium dioxide was 120 nm and the thickness of the silicon oxide on the cerium oxide was 100 nm.

Example 15

A sample was prepared under the same conditions as in Example 10 except that $Nb_{0.2}Ce_{0.8}O$, in which a part of Ce in the cerium dioxide was replaced with Nb, was used instead of the cerium dioxide.

Example 16

A sample was prepared under the same conditions as in Example 10 except that $Nb_{0.4}Ce_{0.6}O$, in which a part of Ce in the cerium dioxide was replaced with Nb, was used instead of the cerium dioxide.

Comparative Example 10

A sample was prepared under the same conditions as in Example 10 except that niobium pentoxide was used instead of the cerium dioxide and the thickness of the niobium pentoxide was 110 nm.

Comparative Example 11

A sample was prepared under the same conditions as Example 10 except that the thickness of the cerium dioxide was 110 nm and no silicon oxide was formed on the cerium dioxide.

Comparative Example 12

A sample was prepared under the same conditions as in Example 10 except that the thickness of the cerium dioxide was 50 nm.

Comparative Example 13

A sample was prepared under the same conditions as in Example 10 except that the thickness of the cerium dioxide was 140 nm.

Comparative Example 14

A sample was prepared under the same conditions as in Example 10 except that the thickness of the silicon oxide on the cerium dioxide was 70 nm.

Comparative Example 15

A sample was prepared under the same conditions as in Example 10 except that the thickness of the cerium dioxide was 120 nm and the thickness of the silicon oxide on the cerium dioxide was 110 nm.

<Measurement of Reflectance>

The reflectance was measured using an ultraviolet-visible near-infrared spectrophotometer UH4150 (manufactured by Hitachi High-Tech Science Co., Ltd.). In order to eliminate the influence of back surface reflection, the back surface of each sample was painted black and only a reflection component on the front surface thereof was measured. Measurements were made in a wavelength range of 300 nm to 800 nm using a specular reflection arrangement with an incident light angle of 5°. Based on the obtained measurement data, a stimulus value Y calculated by a calculation method specified in "JIIS Z-8701" with a light source of D65 and a viewing angle of 2° was defined as the reflectance. In the case of the anti-reflective film, the reflectance is desirably 0.5% or less.

<Steel Wool Test>

A jig (10 mm×10 mm) of a sliding device was covered with steel wool #0000, the surface of each sample was slid on the jig 100 times at a sliding distance of 50 mm while applying a load of 1 kg to the surface of each sample, then the sample was taken out from the sliding device, and the presence or absence of scratches was visually checked.

The results of Verification Example 2 are shown in Table 2.

TABLE 2

| | Material of hard layer | Thickness of hard layer | Thickness of silicon dioxide | Reflectance (Y) | Steel wool test |
|---|---|---|---|---|---|
| Example 10 | $CeO_2$ | 100 nm | 90 nm | 0.3% | No scratches |
| Example 11 | $CeO_2$ | 60 nm | 90 nm | 0.5% | No scratches |
| Example 12 | $CeO_2$ | 130 nm | 90 nm | 0.3% | No scratches |
| Example 13 | $CeO_2$ | 100 nm | 80 nm | 0.4% | No scratches |
| Example 14 | $CeO_2$ | 120 nm | 100 nm | 0.5% | No scratches |
| Example 15 | $Nb_{0.2}Ce_{0.8}O$ | 100 nm | 90 nm | 0.3% | No scratches |
| Example 16 | $Nb_{0.4}Ce_{0.6}O$ | 100 nm | 90 nm | 0.3% | Slight scratches (within usage standard) |
| Comparative Example 10 | $Nb_2O_5$ | 110 nm | 90 nm | 0.4% | Scratches occurred over all |
| Comparative Example 11 | $CeO_2$ | 110 nm | 0 nm | 11.0% | No scratches |
| Comparative Example 12 | $CeO_2$ | 50 nm | 90 nm | 0.4% | Scratches occurred over all |
| Comparative Example 13 | $CeO_2$ | 140 nm | 90 nm | 0.6% | No scratches |
| Comparative Example 14 | $CeO_2$ | 100 nm | 70 nm | 1.1% | No scratches |
| Comparative Example 15 | $CeO_2$ | 120 nm | 110 nm | 1.6% | Scratches occurred partially |

The evaluation of the results shown in Table 2 is as follows.

Results of Examples 10 to 12

As is clear from Table 2, when the cerium dioxide was formed into a film to be a thickness in a range of 60 nm to 130 nm and the thickness of the outermost layer of the silicon oxide was 90 nm, the reflectance was 0.5% or less in all cases. As a result, the obtained film was able to sufficiently function as an anti-reflective film. Furthermore, no scratches were observed in the steel wool test, and the scratch resistance performance (the durability) was sufficiently ensured.

Results of Examples 13 and 14

When the thickness of the silicon dioxide of the outermost surface was varied in a range of 80 nm to 100 nm and the corresponding thickness of the cerium oxide was adjusted to improve the optical properties to form a film, the reflectance was 0.5% or less and no scratches were observed in the steel wool test.

Results of Examples 15 and 16

In order to improve the film formation rate and the discharge stability, niobium was added to a hard layer to be 40% in elemental ratio. The optical properties were almost unchanged from Examples 10 to 14, but a gradual deterioration in scratch resistance performance was observed in the steel wool test, and 40% niobium (Example 16) barely passed the usage standard.

Results of Comparative Example 10

In the related art, in a case where niobium pentoxide, which was widely used as a high refractive index layer, was used, the optical properties were sufficient, but scratches that were visually checked with ease occurred in the steel wool test, and the scratch resistance performance (the durability) was insufficient.

Results of Comparative Example 11

When the outermost surface was made of cerium dioxide instead of silicon dioxide, the steel wool test showed good results, but the reflectance became very high. It was not possible to design an optical layer with a thickness of a hard film of 60 nm or more and a reflectance of 0.5% or less.

Results of Comparative Example 12

When the thickness of the cerium dioxide was 50 nm, scratches that were visually checked with ease occurred in the steel wool test, and the scratch resistance performance (the durability) was insufficient. This means that if the cerium oxide has a thickness of 50 nm or less, sufficient hardness cannot be achieved and the scratch resistance of the optical laminate also deteriorates.

Results of Comparative Example 13

When the thickness of the cerium dioxide was 140 nm, sufficient hardness was obtained and the scratch resistance of the optical laminate was improved, but on the other hand, the reflectance exceeded 0.5%. As a result, the obtained film was not able to sufficiently function as an anti-reflective film. It has been found that in a case where cerium dioxide is formed into a film to be a thickness of 140 nm or more, sufficient anti-reflection performance cannot be obtained even if the thickness of silicon dioxide is adjusted in a range of 80 nm to 100 nm.

Results of Comparative Examples 14 and 15

When the thickness of the silicon dioxide was 70 nm or less or 110 nm or more, even if the cerium dioxide was adjusted to be a thickness of 60 nm or more, the obtained film was not able to sufficiently function as an anti-reflective film. Furthermore, when silicon dioxide is formed into a film to be a thickness of 110 nm or more, the effect of the cerium oxide in the hard layer becomes smaller, and scratches that were visually checked with ease occurred in the steel wool test, and the scratch resistance performance (the durability) was insufficient.

REFERENCE SIGNS LIST

10 Anti-reflective film
11 Transparent substrate
12 Optical laminate
13 Adhesion layer
14 Anti-fouling layer
21 highly durable layer (first function layer)

22 Low refractive index surface layer (second function layer)
23 optical function multilayer film
23*a* High refractive index layer
23*b* Low refractive index layer

The invention claimed is:

1. An optical laminate comprising:

at least two or more optical function layers with visible light transmittance which are laminated, wherein the at least two or more optical function layers include:

a first function layer that includes at least cerium oxide, has a refractive index in a range of 1.8 or more and 2.6 or less at a wavelength of 550 nm, and has a film thickness in a range of 60 nm or more and 130 nm or less;

a second function layer that is formed in contact with an upper surface of the first function layer, constitutes an uppermost layer of the optical laminate, has a refractive index in a range of 1.4 or more and 1.6 or less at a wavelength of 550 nm, and has a film thickness in a range of 80 nm or more and 100 nm or less;

a low refractive index layer that is formed in contact with a lower surface of the first function layer; and a high refractive index layer that is formed in contact with a lower surface of the low refractive index layer, and contains an inorganic oxide selected from a group consisting of niobium pentoxide, titanium oxide, tungsten oxide, tantalum pentoxide, zinc oxide, indium tin oxide, and zirconium oxide.

2. The optical laminate according to claim 1, wherein the first function layer contains at least one metal oxide other than cerium oxide in an elemental ratio in a range of 0.1% or more and 50% or less.

3. The optical laminate according to claim 1, wherein the second function layer contains at least silicon.

4. An anti-reflective film obtained using the optical laminate according to claim 1.

5. The anti-reflective film according to claim 4, wherein the optical laminate is supported by a transparent substrate made of a polymer film with visible light transmittance.

6. The anti-reflective film according to claim 5, wherein an adhesion layer is formed between the optical laminate and the transparent substrate.

7. The optical laminate according to claim 1, wherein the optical laminate is used in an anti-reflective film, and wherein an anti-fouling layer is formed over the second function layer.

8. The optical laminate according to claim 1, wherein the low refractive index layer has a refractive index less than a refractive index of the first function layer, and the high refractive index layer has a refractive index greater than the refractive index of the low refractive index layer.

9. The optical laminate according to claim 1, wherein the first function layer contains at least one metal oxide other than cerium oxide in an elemental ratio in a range of 0.1% or more and 40% or less.

* * * * *